May 22, 1945.  H. LAW  2,376,495
WORK HANDLING MECHANISM
Filed May 24, 1943  2 Sheets-Sheet 1

INVENTOR
Hugh Law
BY
ATTORNEY

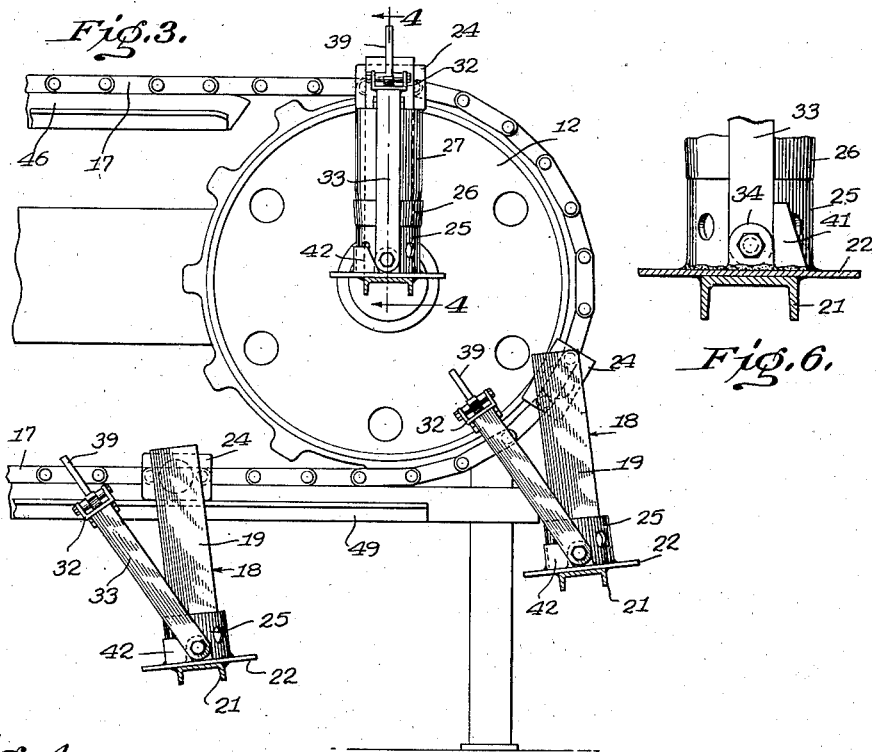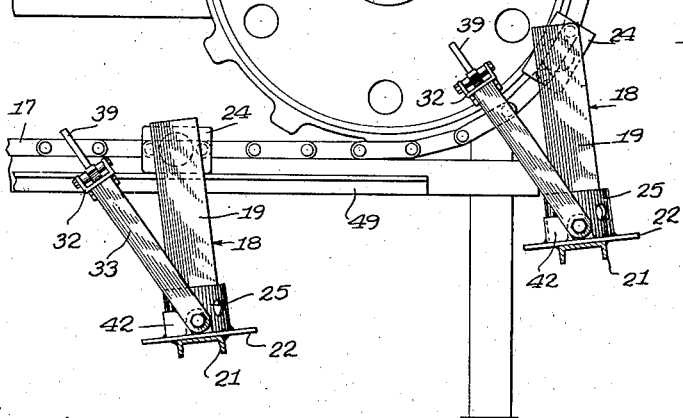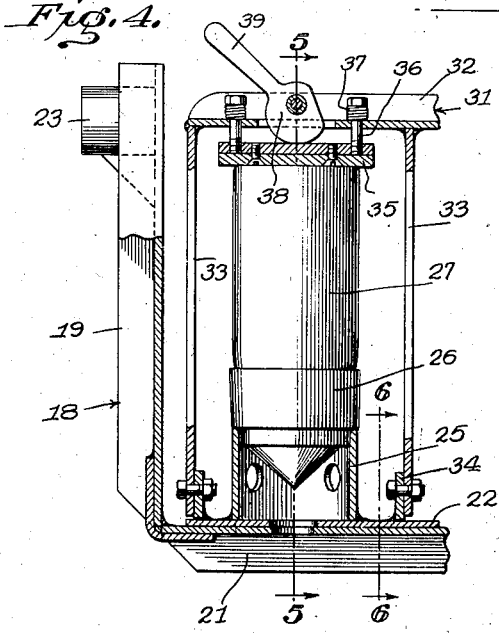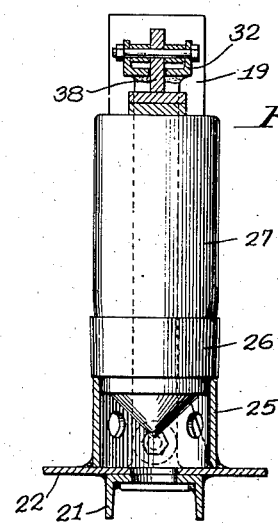

Patented May 22, 1945

2,376,495

UNITED STATES PATENT OFFICE 2,376,495

WORK HANDLING MECHANISM

Hugh Law, Detroit, Mich., assignor to Budd Wheel Company, Philadelphia, Pa., a corporation of Pennsylvania Application May 24, 1943, Serial No. 488,157

7 Claims. (Cl. 198—131)

This invention relates to work conveying and handling mechanisms and particularly to a mechanism for holding and conveying workpieces through a zone of treatment.

An object of the invention is to provide a work handling mechanism constructed and arranged to render easy and rapid both the securing of workpieces in place and the release and removal thereof from the mechanism.

A further object is to provide an improved work holding and clamping device constructed and arranged for use in holding shell forgings and their associated nose pieces or windshields during cooling thereof while the solder joining them cools and hardens.

A still further object is to provide an improved work holder especially adapted for holding workpieces on an endless conveyor.

These and other objects which will be apparent are accomplished by the present invention, one embodiment of which is shown for the purposes of illustration in the accompanying drawings in which:

Fig. 3 is a side elevation of the structure shown in Fig. 2, partly in section on the line 3—3 of Fig. 2;

Fig. 4 is a sectional view on the line 4—4 of Fig. 3, and

Figure 1:
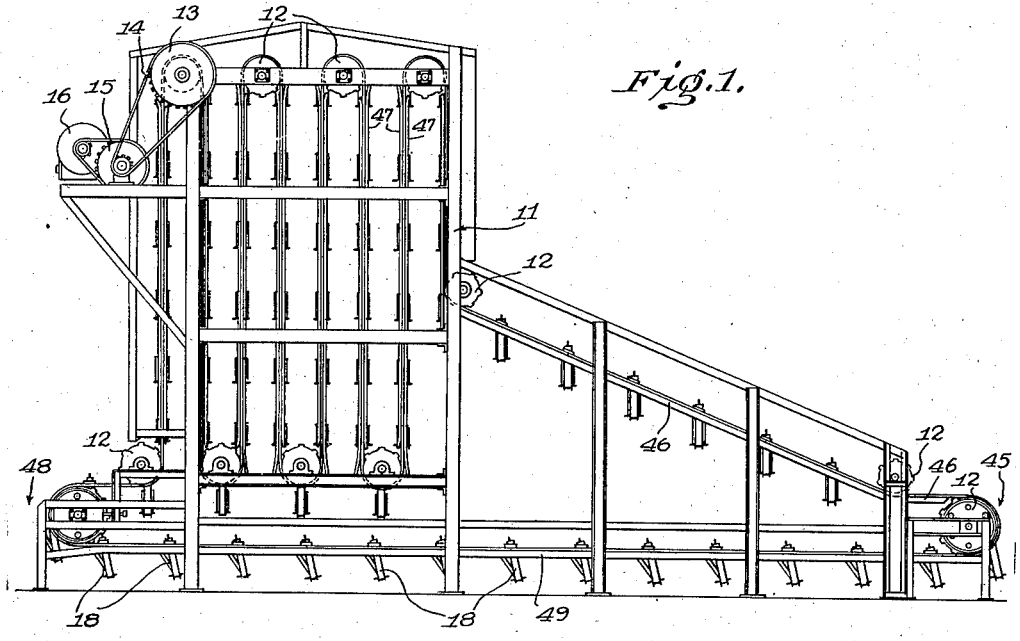
Fig. 1 is a side elevation of a cooling tower provided with a work handling mechanism constructed in accordance with one embodiment of this invention.

Figs. 5 and 6 are sections on the lines 5—5 and 6—6, respectively, of Fig. 4.

Although, for the purposes of description, the present invention is shown in connection with a mechanism for conveying shell forgings through a cooling tower, it will be apparent that many novel features of the invention are adapted for use with other articles and for other purposes.

As illustrated, the invention is shown in connection with a cooling tower 11 through which the workpieces are carried by an endless conveyor passing over guiding sprockets or pulleys 12 and driven from a driving sprocket 13 connected by a driving belt 14 with a speed reducer 15, in turn driven by a motor 16. The endless conveyor illustrated in the drawing is formed by a pair of parallel chains 17 and the guiding sprockets 12 are formed in duplicate for engagement with the parallel chains.

Spaced along and hung between the sprocket chains 17 at regular intervals are work clamping and holding devices each of which comprises an open, generally U-shaped supporting frame 18 formed of parallel side hangers 19 connected at their lower ends by a transverse work supporting bar 21 on which a work supporting platform 22 is mounted. The upper end of each hanger 19 is supported by a trunnion 23 pivotally hung in a trunnion plate 24 riveted to the adjacent chain link and movable therewith. Work supports 25 are mounted on the supporting platform 22, the shape, arrangement and number thereof being determined by the particular article to be clamped in place. In the illustrated embodiment, the work supports are cylindrical members adapted to engage a nose piece 26 used to form a windshield for projectiles 27, or the like, although it should be understood that other specific forms of work supports for use with other workpieces may be employed.

Figure 2:
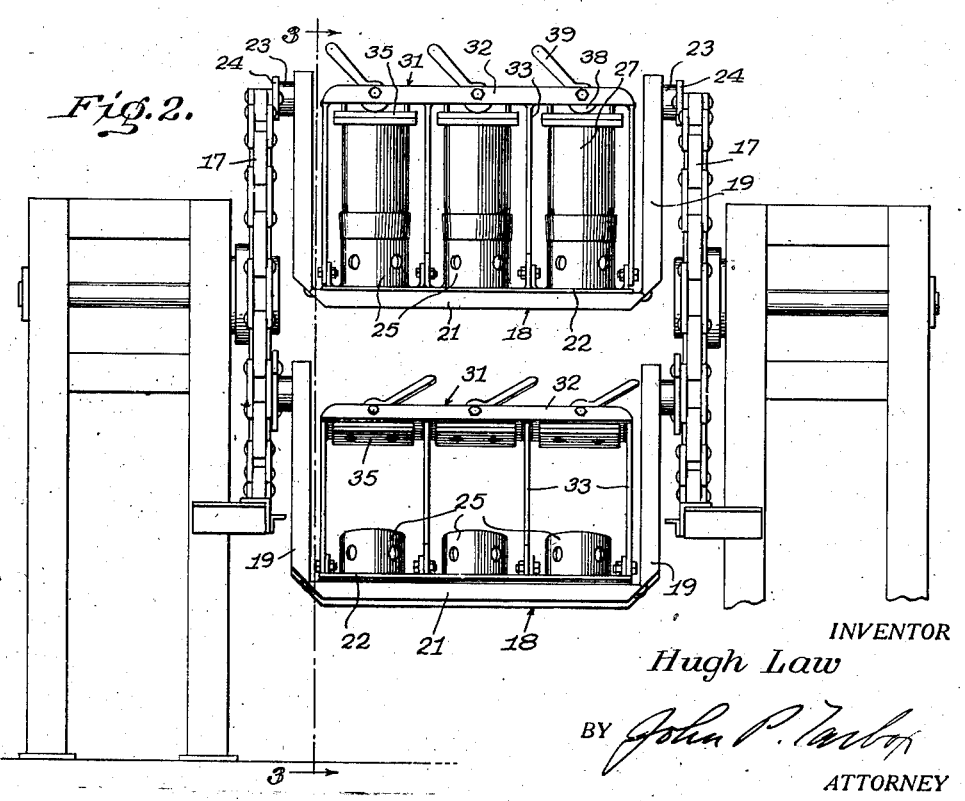
Fig. 2 is a view in elevation looking from the right of Fig. 1.

A clamping means for securing the workpieces in place on the work support 25 is formed by an open frame 31 including a clamping bar 32 extending parallel to the work supporting surface 22 and having a plurality of arms 33 secured at spaced intervals to the clamping bar and extending downwardly to the supporting platform, the arms being pivoted to connecting lugs 34 on the platform to permit swinging movement of the clamping frame relative to the supporting frame between the inoperative position shown at the bottom of Figs. 2 and 3, and the operative work clamping position shown at the tops of Figs. 2 and 3 and in Fig. 4. Individual, work-engaging clamping pads 35, secured to the lower ends of bolts 36 extending through the clamping bar 31 and provided with springs 37 for normally biasing the clamping pads away from the workpiece, are adapted to be moved into work clamping position by manually operated cams 38 having handles 39 for operation thereof.

It will be apparent that a plurality of workpieces can be easily and quickly secured in place merely by suitably positioning them on the work supports 25 and then clamping them in place by moving the clamping bar 32 into position for the clamping pads 35 to engage the opposite ends of the workpieces, and thereupon operating the different cams 38 to press the individual pads 35 against the tension of the springs 37 into clamping engagement with the article. In the same way, the articles can be quickly and easily removed from the holder by releasing the cams 38, permitting the springs 37 to shift the clamping pads 35 away from engagement with the article and then moving the clamping frame 32 to the inoperative position. This leaves the articles open to access and easy removal. The operative and inoperative positions of the clamping frame 32 are determined by suitable stops such as the stop block 41, see Fig. 6, for properly locating the frame in clamping position, and the block 42, on the other side of the work support 25 for locating and limiting the movement of the clamping frame to inoperative position, see Fig. 3.

As illustrated in Fig. 1, the cooling tower 11 is arranged with a loading station 45 where workpieces, such as the shells 27 to which the nosepieces 26 have just been secured by a soldering operation, are mounted and clamped in the supporting frames 18. Supporting and guiding rails 46, see Figs. 1 and 3, engage the trunnions 23 at each side of the work holding frame to guide and support the movement thereof. From the loading station 45 the rails 46 incline upwardly to the main frame of the cooling tower 11. In passing through the tower the different runs of the chains are substantially vertical and pairs of guide rails 47 are provided to guide the trunnions along each of the successive runs. The tower is of such size and the speed of travel of the articles through the tower is such that by the time the conveyor reaches the unloading station 48 the solder joining the nose pieces to the shells will have thoroughly cooled and solidified. At the unloading station, the cooled shells can be easily removed from the work holders by throwing the cam levers 39 to release the clamping pads 35 and shifting the clamping frame 32 to inoperative position, whereupon the work pieces can be easily removed. The travel of the clamping mechanism from the unloading position 48 to the loading position 45 is along suitable guide rails 49. During this run the clamping frames 31 can be left in inoperative position. Obviously, movement of the conveyor through the cooling tower can be either intermittent or continuous, as desired.

Although I have described in detail one specific embodiment of the present invention, it will be apparent that the invention can be variously modified and adapted within the scope of the appended claims.

What is claimed is:

1. Work handling mechanism comprising the combination with an endless conveyor of a pivoted article supporting frame, an article supporting member on said frame, clamping means for securing an article in position on said member including a rectangular clamping frame pivoted to said supporting frame and movable into and out of article clamping position, means on said clamping frame for engaging an article and clamping it in position on said supporting means and means on said supporting frame for limiting the movement of said clamping frame out of clamping position.

2. Work handling mechanism comprising the combination with an endless conveyor formed by parallel chains having spaced work supporting trunnion blocks, of a succession of work supports, each including a work supporting frame pivotally suspended between opposite trunnion blocks, work positioning means on said frame, a work holding strap hinged to each frame and movable into and out of work clamping position, a manually operated work clamping member on said strap adapted to engage the end of a workpiece located on said work positioning means, and means for manually actuating said clamping member.

3. Work handling mechanism comprising a pivotally mounted work supporting frame, work positioning means on said frame, a work holding strap hinged to said frame and movable into and out of work clamping position, a work clamping member on said strap adapted to engage the end of a workpiece located on said work positioning means, means for yieldingly biasing said clamping member away from said workpiece, and a manually operable cam for pressing said member into clamping engagement with a workpiece and for holding it in clamping position against the tension of said yielding means.

4. A work handling mechanism comprising the combination with an endless conveyor of an article supporting frame, means for pivotally suspending said frame from said conveyor, means on said frame for engaging the lower end of an article for supporting an article on said frame in upright position to permit said article being grasped by hand, a clamping frame secured to said supporting frame and adapted to swing into and out of position adjacent the upper end of an article, and manually operated clamping means on said clamping frame for engaging the upper end of an article.

5. In an article conveying mechanism having movable conveyor elements, a carrier for an elongated article to be conveyed, comprising an upright frame, means on said frame to supportingly engage the lower end of the article, an inverted U-shaped frame, pivot means below the center of gravity of said U-shaped frame pivotally connecting said U-shaped frame to said upright frame for swinging movement into and out of alignment with said first mentioned means, a clamping element movably carried by said U-shaped frame, actuating means carried by said U-shaped frame for moving and locking said clamping element in engagement with the upper end of the article as supported by said upright frame, and pivot means disposed above the center of gravity of the carrier and the article supported thereby and pivotally connecting said upright frame to said conveyor elements.

6. In an article conveying mechanism having movable conveyor elements, an article carrier pivotally connected to said elements and comprising a rigid support frame, means on said support frame to support one end of the article to be conveyed, a clamping frame, means connecting said clamping frame to said support frame for movement into and out of alignment with the article as supported by said support frame, a clamp element carried by said clamping frame for movement, and manually operable means carried by said clamping frame independently of said clamp element for moving and locking said clamp element in engagement with the other end of the article as supported by said support frame.

7. In an article conveying mechanism having movable conveyor elements, an article carrier pivotally connected to said elements and comprising a rigid support frame, means on said support frame to support one end of the article to be conveyed, a clamping frame, means connecting said clamping frame to said support frame for movement into and out of alignment with the article as supported by said support frame, a clamp element carried by said clamping frame for movement, manually operable means carried by said clamping frame independently of said clamp element for moving and locking said clamp element in engagement with the other end of the article as supported by said support frame, and spring means associated with said clamping frame and clamp element normally urging said clamp element to non-clamping position.

HUGH LAW.